United States Patent
Ritter et al.

(10) Patent No.: US 11,423,300 B1
(45) Date of Patent: Aug. 23, 2022

(54) SELECTING ACTIONS BY REVERTING TO PREVIOUS LEARNED ACTION SELECTION POLICIES

(71) Applicant: DeepMind Technologies Limited, London (GB)

(72) Inventors: Samuel Ritter, London (GB); Xiao Jing Wang, London (GB); Siddhant Jayakumar, London (GB); Razvan Pascanu, Letchworth Garden City (GB); Charles Blundell, London (GB); Matthew Botvinick, Philadelphia, PA (US)

(73) Assignee: DeepMind Technologies Limited, London (GB)

( * ) Notice: Subject to any disclaimer, the term of this patent is extended or adjusted under 35 U.S.C. 154(b) by 868 days.

(21) Appl. No.: 16/271,533

(22) Filed: Feb. 8, 2019

Related U.S. Application Data

(60) Provisional application No. 62/628,881, filed on Feb. 9, 2018.

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC .................................. G06N 3/08; G06N 3/04
USPC ........................................................ 706/25
See application file for complete search history.

(56) References Cited

U.S. PATENT DOCUMENTS

| | | | |
|---|---|---|---|
| 7,409,374 B1 * | 8/2008 | Hohil ................... | G05B 23/024 706/15 |
| 8,511,145 B1 * | 8/2013 | Desai ..................... | G06N 3/084 73/35.14 |
| 10,254,759 B1 * | 4/2019 | Faust ....................... | G06N 3/08 |

(Continued)

OTHER PUBLICATIONS

'rd.springer.com' [online] "Dirichlet Process," Yee Whye The, Encyclopedia of Machine Learning, Available on or before 2011 [retrieved on Feb. 5, 2019] Retrieved from Internet: URL< https://rd.springer.com/referenceworkentry/10.1007%2F978-0-387-30164-8_219 > 19 pages.

(Continued)

*Primary Examiner* — April G Gonzales
(74) *Attorney, Agent, or Firm* — Fish & Richardson P.C.

(57) ABSTRACT

Methods, systems, and apparatus, including computer programs encoded on a computer storage medium, for generating a system output using a remembered value of a neural network hidden state. In one aspect, a system comprises an external memory that maintains context experience tuples respectively comprising: (i) a key embedding of context data, and (ii) a value of a hidden state of a neural network at the respective previous time step. The neural network is configured to receive a system input and a remembered value of the hidden state of the neural network and to generate a system output. The system comprises a memory interface subsystem that is configured to determine a key embedding for current context data, determine a remembered value of the hidden state of the neural network based on the key embedding, and provide the remembered value of the hidden state as an input to the neural network.

20 Claims, 5 Drawing Sheets

(56) References Cited

U.S. PATENT DOCUMENTS

| | | | | |
|---|---|---|---|---|
| 2010/0138026 | A1* | 6/2010 | Kaushal | G06N 5/04 |
| | | | | 706/23 |
| 2015/0106310 | A1* | 4/2015 | Birdwell | G06N 3/086 |
| | | | | 706/26 |
| 2016/0352656 | A1* | 12/2016 | Galley | H04L 51/02 |
| 2019/0138599 | A1* | 5/2019 | Sen | G06F 40/284 |
| 2019/0220738 | A1* | 7/2019 | Flank | G06N 3/08 |
| 2022/0138559 | A1* | 5/2022 | Gangi Reddy | G06N 3/08 |
| | | | | 706/25 |
| 2022/0138577 | A1* | 5/2022 | Young | G06N 3/08 |
| | | | | 706/25 |

OTHER PUBLICATIONS

Andrychowicz et al. "Learning to learn by gradient descent by gradient descent," NIPS, Dec. 2016, 9 pages.
Auer et al. "Finite-time analysis of multi-armed bandit problem," Machine Learning, 47(2-3), May 2002, 22 pages.
Blackwell et al. "Ferguson distributions via polya urn schemes," The annals of statistics, vol. 1(2), Mar. 1973, 3 pages.
Blundell et al. "Model-free episodic control," arXiv 1606.04460, Jun. 14, 2016, 12 pages.
Daw et al. "Model-based influence on humans choices and striatal prediction errors," Neuron 69(6), Mar. 24, 2011, 12 pages.
Duan et al. "RL2: Fast reinforcement learning via slow reinforcement learning," arXiv 1611.02779v2, Nov. 10, 2016, 14 pages.
Finn et al. "Model-agnostic meta-learning for fast adaptation of deep networks," arXiv 1703.03400v3, Jul. 18, 2017, 13 pages.
Gittins et al. "Bandit processes and dynamic allocation indices," Journal of the Royal Statistical Society, Series B (Methodological), Jan. 1979, 31 pages.
Graves et al. "Hybrid computing using a neural network with dynamic external memory," Nature 538(7626), Oct. 2016, 21 pages.
Hadsell et al. "Dimensionality reduction by learning an invariant mapping," IEEE Computer Society Conference on Computer Vision and Pattern Recognition, Jun. 17, 2006, 8 pages.
Hochreiter et al. "learning to learn using gradient descent," International Conference on Artificial Neural Networks, Springer Aug. 21, 2001, 8 pages.
Hoskin et al. "Refresh my memory: Episodic memory reinstatements intrude on working memory maintenance," bioRxiv Jul. 31, 2017, http:dx.doi.org/10.1101/170720, 37 pages.
Huberman et al. "Strong regularities in world wide web surfing," Science, 280(5360), Apr. 1998, 8 pages.
Kaiser et al. "Learning to remember rare events," arXiv 1703.03129v1, Mar. 9, 2017, 10 pages.
Kirkpatrick et al. "Overcoming catastrophic forgetting in neural networks," Proceedings of the National Academy of Sciences, Mar. 2017, 6 pages.
Lake et al. "Human-level concept learning through probabilistic program induction," Science, 350(6266) Dec. 2015, 8 pages.
Marr. "Simple memory: a theory for archicortex," Philosophical transactions of the Royal Society of London, Series B, Biological sciences, vol. 262(841) Jul. 1971, 63 pages.
O'Donnell et al. "Fragment grammars: Exploring computation and reuse in language," MIT Computer Science and Artificial Intelligence Laboratory Technical Report Series, Mar. 2009, 65 pages.
Pritzel et al. "Neural episodic control," arXiv 1703.01988, Mar. 6, 2017, 12 pages.
Ring et al. "Continual Learning in Reinforcement Environments," PhD Dissertation for Doctor of Philosophy at the university of Texas at Austin, Aug. 1994, 138 pages.
Ritter et al. "Episodic control as meta-reinforcement learning," bioRxiv https://dx.doi/10.1101/.360537, Jul. 3, 2018, 7 pages.
Santoro et al. "One-shot learning with memory-augmented neural networks," arXiv 1605.06065, May 19, 2016, 13 pages.
Schmidhuber et al. "Simple principles of metalearning," Technical report, Jun. 27, 1996, 23 pages.
Vikbladh et al., "Episodic contribution to model-based reinforcement learning," Annual Conference on Cognitive Computational Neuroscience, CNN, Sep. 2017, 2 pages.
Vinyals et al. "Matching networks for one shot learning," NIPS, Dec. 2016, 9 pages.
Wang et al. "Learning to reinforcement learn," arXiv 1611.05763v3, Jan. 23, 2017, 17 pages.
Weston et al. "Memory networks," arXiv 1410.3916v11, Nov. 29, 2015, 15 pages.

* cited by examiner

SELECTING ACTIONS BY REVERTING TO PREVIOUS LEARNED ACTION SELECTION POLICIES

CLAIM OF PRIORITY

This application claims the benefit of U.S. Provisional Patent Application No. 62/628,881, entitled, "NEURAL NETWORKS WITH EPISODIC RECALL", filed on Feb. 9, 2018. The entire contents of which are hereby incorporated by reference.

BACKGROUND

This specification relates to reinforcement learning.

An agent can interact with an environment by performing actions that are selected in response to receiving observations that characterize the current state of the environment. The action to be performed by the agent in response to receiving a given observation can be determined in accordance with the output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that selects actions to be performed by an agent interacting with an environment using an action selection neural network. In particular, the system can process a current observation characterizing a current state of the environment and a "remembered" value of a hidden state of the action selection network to generate an action selection output.

According to a first aspect there is provided a system comprising one or more computers and one or more storage devices storing instructions that when executed by the one or more computers cause the one or more computers to implement: an external memory, wherein the external memory maintains a plurality of context experience tuples, each context experience tuple comprising: (i) a key embedding of context data that characterizes a context of a system input at a respective previous time step, and (ii) a value of a hidden state of a neural network at the respective previous time step; and the neural network, wherein the neural network is configured to, at each of a plurality of time steps: receive a system input and a remembered value of the hidden state of the neural network, and process the system input and the remembered value of the hidden state in accordance with current parameter values of the neural network to generate a system output; and a memory interface subsystem that is configured to, at each of a plurality of time steps: receive current context data that characterizes a current context of a system input; determine a key embedding for the current context data; determine a remembered value of the hidden state of the neural network based on the key embedding for the current context data, comprising combining one or more previous values of the hidden state of the neural network included in context experience tuples in the external memory; and provide the remembered value of the hidden state as an input to the neural network.

In some implementations, the neural network is an action selection neural network that is used to select actions to be performed by an agent interacting with an environment, the system input comprises an observation characterizing a current state of the environment, and the system output comprises an action selection output.

In some implementations, the neural network is a long short-term memory network and the hidden state of the neural network is a cell state.

In some implementations, generating the system output comprises: determining a gating vector with a same dimensionality as the hidden state of the neural network, comprising processing the system input in accordance with current parameter values of the neural network; and generating the system output based at least on a pointwise product of the gating vector and the remembered value of the hidden state of the neural network.

In some implementations, each entry of the gating vector is between 0 and 1.

In some implementations, determining the remembered value of the hidden state of the neural network comprises: determining a respective weight for each of k nearest key embeddings included in context experience tuples in the external memory from distances between the k nearest key embeddings and the current key embedding according to a distance measure; for each of the k nearest key embeddings in the external memory, weighting the value of the hidden state corresponding to the key embedding by the weight for the key embedding; and determining the remembered value of the hidden state by combining the values of the hidden states corresponding to the k nearest key embeddings based on the weights.

In some implementations, the memory interface subsystem is further configured to, at each of a plurality of time steps: determine whether the current key embedding matches any of the key embeddings included in context experience tuples currently in the external memory; and when the current key embedding does not match any of the key embeddings included in context experience tuples currently in the external memory: adding a new context experience tuple to the external memory, the new context experience tuple comprising: (i) the current key embedding, and (ii) the current value of the hidden state of the neural network.

In some implementations, when the current key embedding matches a key embedding included in a context experience tuple currently in the external memory, the system updates the context experience tuple currently in the external memory by setting the value of the hidden state included in the experience tuple to be the current value of the hidden state of the action selection neural network.

In some implementations, the action selection neural network is trained using reinforcement learning training techniques.

In some implementations, the action selection output is a probability distribution over a set of actions that can be performed by the agent.

In some implementations, the action selection output indicates a single action to be performed by the agent.

In some implementations, the action to be performed by the agent is selected based on the action selection output with probability $1-\epsilon$, and is selected randomly from a set of actions that can be performed by the agent with probability $\epsilon$, where $\epsilon \in (0,1)$.

In some implementations, determining a key embedding for the current context data comprises processing the current context data by an embedding neural network.

In some implementations, the embedding network is a convolutional neural network.

In some implementations, the context data comprises an image.

In some implementations, the context data comprises a sequence of alpha-numeric characters.

According to a second aspect there are provided one or more non-transitory computer storage media storing instructions that when executed by one or more computers cause the one or more computers to perform the operations of the system of the first aspect.

According to a third aspect there is provided a method performed by one or more data processing apparatus, the method comprising the operations of the system of the first aspect.

Particular embodiments of the subject matter described in this specification can be implemented so as to realize one or more of the following advantages.

The system described in this specification can effectively train an agent to accomplish multiple "reoccurring" tasks. A task is said to be reoccurring if the system trains the agent to accomplish the task multiple times (i.e., over multiple disjoint sequences of time steps), and between training the agent to accomplish the given task different times, the system trains the agent to accomplish other tasks. After the system has trained the agent to accomplish a given task over a number of time steps, the hidden states of the action selection network being used by the system implicitly represent information that the system has "learned" about the given task. When the system later resumes training the agent to perform a reoccurring task, the system can use a "remembered" value of the hidden state of the action selection network that represents information previously learned by the system about the task. This enables the system to revert back to a previously learned action selection policy (i.e., based on the remembered value of the hidden state of the action selection network) rather than relearning information about the task.

In contrast, some conventional systems reset the values of the hidden states of the action selection network before resuming training of the agent to accomplish a given reoccurring task. This forces the conventional system to relearn the information that was represented by the hidden states of the action selection network when the conventional system previously trained the agent to accomplish the task.

By exploiting previously discovered information without having to relearn it, the system described in this specification can train an agent to achieve a higher level of performance at each of multiple reoccurring tasks than if the agent were trained by some conventional systems. Moreover, the system described in this specification may consume fewer computational resources than some conventional systems by training an agent to achieve an acceptable level of performance in each of multiple reoccurring tasks over fewer training iterations. Examples of computational resources include memory and computing power.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
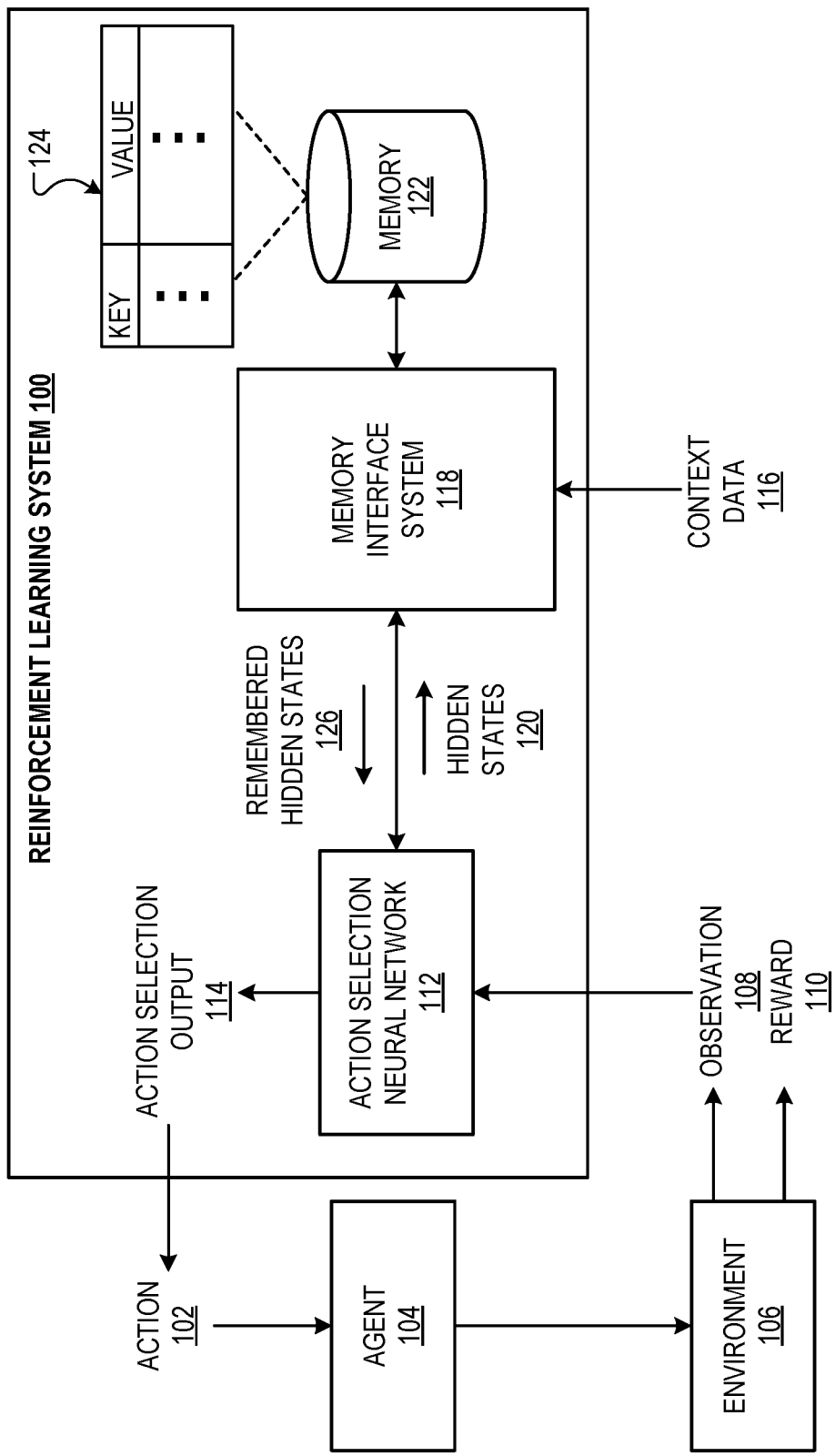
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The system 100 selects actions 102 to be performed by an agent 104 interacting with an environment 106 at each of multiple time steps. At each time step, the system 100 receives data characterizing the current state of the environment 106, e.g., an image of the environment 106, and selects an action 102 to be performed by the agent 104 in response to the received data. Data characterizing a state of the environment 106 will be referred to in this specification as an observation 108.

At each time step, the state of the environment 106 at the time step (as characterized by the observation 108) depends on the state of the environment 106 at the previous time step and the action 102 performed by the agent 104 at the previous time step.

At each time step, the system 100 may receive a reward 110 based on the current state of the environment 106 and the action 102 of the agent 104 at the time step. In general, the reward 110 is a numerical value. The reward 110 can be based on any event or aspect of the environment 106. For example, the reward 110 may indicate whether the agent 104 has accomplished a task (e.g., navigating to a target location in the environment 106) or the progress of the agent 104 towards accomplishing a task.

In some implementations, the environment is a real-world environment and the agent is a mechanical agent interacting with the real-world environment. For example, the agent may be a robot interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment.

In these implementations, the observations may include, for example, one or more of images, object position data, and sensor data to capture observations as the agent as it interacts with the environment, for example sensor data from an image, distance, or position sensor or from an actuator.

For example in the case of a robot the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

In these implementations, the actions may be control inputs to control the robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g braking and/or acceleration of the vehicle.

In some implementations the environment is a simulated environment and the agent is implemented as one or more computers interacting with the simulated environment.

For example the simulated environment may be a simulation of a robot or vehicle and the reinforcement learning system may be trained on the simulation. For example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle.

In another example, the simulated environment may be a video game and the agent may be a simulated user playing the video game.

In a further example the environment may be a protein folding environment such that each state is a respective state of a protein chain and the agent is a computer system for determining how to fold the protein chain. In this example, the actions are possible folding actions for folding the protein chain and the result to be achieved may include, e.g., folding the protein so that the protein is stable and so that it achieves a particular biological function. As another example, the agent may be a mechanical agent that performs or controls the protein folding actions selected by the system automatically without human interaction. The observations may include direct or indirect observations of a state of the protein and/or may be derived from simulation.

In a similar way the environment may be a drug design environment such that each state is a respective state of a potential pharma chemical drug and the agent is a computer system for determining elements of the pharma chemical drug and/or a synthetic pathway for the pharma chemical drug. The drug/synthesis may be designed based on a reward derived from a target for the drug, for example in simulation. As another example, the agent may be a mechanical agent that performs or controls synthesis of the drug.

Generally in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment is a real-world environment and the agent manages distribution of tasks across computing resources e.g. on a mobile device and/or in a data center. In these implementations, the actions may include assigning tasks to particular computing resources.

As further example, the actions may include presenting advertisements, the observations may include advertisement impressions or a click-through count or rate, and the reward may characterize previous selections of items or content taken by one or more users.

Optionally, in any of the above implementations, the observation at any given time step may include data from a previous time step that may be beneficial in characterizing the environment, e.g., the action performed at the previous time step, the reward received at the previous time step, and so on.

The system 100 includes an action selection neural network 112 that is configured to process an input that includes an observation 108 in accordance with current values of action selection network parameters to generate an action selection output 114. The system 100 can use the action selection output 114 to select the action 102 to be performed by the agent 104 in response to the observation 108. The action selection output 114 may define a probability distribution over a set of possible actions that can be performed by the agent by associating a respective probability value with each action in the set of possible actions. The system 100 can select the action to be performed by the agent by sampling an action from the set of possible actions in accordance with the probability distribution over the set of possible actions. The system 100 can also select the action to be performed by the agent by selecting the action from the set of possible actions which is associated with the highest probability according to the probability distribution over the set of possible actions. Alternatively, the action selection output may indicate a single action to be performed by the agent by specifying an index corresponding to a particular action in the set of possible actions.

In some cases, the system 100 can select the action 102 to be performed by the agent 104 using an exploration policy. An exploration policy defines a procedure by which the system 100 selects actions 102 to be performed by the agent 104 which are different from the actions that would be selected based on the action selection outputs 114 generated by the action selection neural network 112. For example, the exploration policy may be an ϵ-greedy exploration policy. In this example, at each time step, the system selects the action to be performed by the agent based on the action selection output 114 (e.g., as described earlier) with probability 1−ϵ (where ϵ is a number between 0 and 1). With probability ϵ, the system 100 selects the action to be performed by the agent by randomly sampling an action from the set of possible actions. By using an exploration policy, the system 100 can cause the agent 104 to explore the environment (e.g., by causing the environment to transition into previously unseen states). The system 100 can exploit the new information learned during exploration of the environment to train the action selection network 112 to select actions that enable the agent 104 to accomplish tasks more effectively.

Generally, the action selection network 112 can have any appropriate neural network architecture. In this specification, the action selection network 112 should be understood to be a recurrent neural network. A recurrent neural network is a neural network that is configured to update a "hidden state" at each time step based at least in part on the value of the hidden state at a previous time step. A hidden state of a neural network refers to an ordered collection of numerical values that represents the activations of one or more neurons of one or more hidden layers of the neural network. In one example, the action selection network 112 may be a long short-term memory (LSTM) recurrent neural network (with a hidden "cell" state) or a gated recurrent unit (GRU) recurrent neural network.

The system 100 can train the action selection network 112 by iteratively adjusting the values of the action selection network parameters over multiple time steps using reinforcement learning techniques (e.g., actor-critic or Q-learning techniques). For example, the system 100 can adjust the values of the action selection network parameters to cause the agent to perform actions which result in the system 100 receiving a higher cumulative measure of reward. Training the action selection network 112 enables the system 100 to select actions that allow the agent to accomplish tasks more effectively (e.g., more quickly).

The system 100 can train the agent 104 to accomplish multiple related yet different tasks. For example, the system 100 may train the agent 104 to accomplish a first task over a first number of time steps, a second task over a second number of time steps, and so on. Each task may be characterized by a different reward process (i.e., the reward that is received as a result of performing a given action in response to a given observation varies depending on the task). Moreover, some or all of the tasks which the system trains the agent 104 to accomplish may be reoccurring. A given task is said to be reoccurring if the system 100 trains the agent 104 to accomplish the given task multiple times, and between training the agent 104 to accomplish the given task different times, the system 100 trains the agent to accomplish other tasks.

For example, the agent may be an industrial robot that performs component assembly tasks by assembling components into different manufactured products. In this example, each task corresponds to assembling components into a respective manufactured product, and the system 100 may train the agent 104 to accomplish multiple reoccurring component assembly tasks. As another example, the agent may be a personal assistance device. In this example, tasks may correspond to making appointments (e.g., at a restaurant or salon), retrieving search results, over providing the weather forecast. Each of these tasks may be reoccurring, as the user may request that the personal assistant device accomplish each of them multiple times (e.g., over the course of a day). As another example, the agent may be a robotic agent that is configured to explore and navigate an environment. In this example, tasks may correspond to exploring and navigating different portions of the environment, and reoccurrence may occur when the agent re-enters a previously explored portion of the environment.

After the system 100 has trained the agent to accomplish a given task over a number of time steps, the hidden states of the action selection network 112 implicitly represent information that the system 100 has "learned" about the given task. For example, if the given task is to explore a particular environment, then the hidden states of the action selection network may implicit represent information about the structure of the particular environment and how to efficiently navigate between different points in the particular environment.

In some conventional reinforcement learning systems, before training the agent to accomplish a given task in a sequence of reoccurring tasks, the conventional system "resets" the values of the hidden states of the action selection network 112. For example, if the action selection network 112 is an LSTM network, the conventional system may set the value of the cell state of the LSTM network to a default (i.e., predetermined) value. Therefore, each time the conventional system resumes training the agent to accomplish a given reoccurring task, the agent is forced to relearn the information that was represented by the hidden states of the action selection network 112 when the conventional system previously trained the agent to accomplish the task.

In contrast to these conventional systems, when the system 100 resumes training the agent to perform a reoccurring task, the system 100 can use a "remembered" value of the hidden state of the action selection network 112 that represents information previously learned by the agent about the task. This enables the system 100 to revert back to a previously learned action selection policy (i.e., based on the remembered value of the hidden state of the action selection network 112) rather than relearning information about the task, as will be described in more detail below.

At each time step, the system 100 receives context data 116 that characterizes a current task the agent is required to accomplish (e.g., by characterizing a "context" of observation at the time step). The context data 116 may be represented in any appropriate format. For example, the context data 116 may be a "label" defined by a sequence of characters (e.g., alpha-numeric characters), an image, or an audio data segment. The context data may define a particular current task the agent is required to accomplish. For example, the context data may define a particular component assembly task to be accomplished by a robotic agent.

The context data 116 may be obtained by the system 100 from any appropriate source. For example, the context data 116 may be provided to the system 100 by a user of the agent (i.e., a person or system that oversees operation of the agent). In a particular example, the context data may define component assembly tasks, and the context data may be provided to the system 100 by a user transmitting data to the agent over a data communication network (e.g., the Internet) or by speaking to the agent. As another example, the context data 116 may be derived from the observations 108 characterizing the current state of the environment 106. In a particular example, the context data may define component assembly tasks, and system 100 may obtain the context data by processing an image of the environment. For example, system 100 may process an image of the environment by identifying and parsing a barcode label visible in the image that defines the component assembly task to be accomplished.

The system 100 includes a memory interface system 118 that is configured to process context data 116 to generate an embedding (referred to as "key" embedding) of the context data. The key embedding of the context data is a representation of the context data as an ordered collection of numerical values (e.g., a vector or matrix of numerical values). The memory interface system 118 can generate the key embedding of context data in any appropriate manner, for example, by processing the context data using an embedding neural network. In a particular example, if the context data is an image, the memory interface system 118 can generate the key embedding of the context data using a neural network that includes a sequence of convolutional layers followed by a final fully connected layer.

At some or all of the time steps, the memory interface system 118 stores: (i) the key embedding of the context data received at the time step, and (ii) the value of a hidden state 120 of the action selection network 112 at the time step, in a memory 122. In particular, the system may store the value of the hidden state of the action selection network 112 after the action selection network 112 has processed the observation characterizing the current state of the environment at the time step. For convenience, the key embedding of the context data and the value of the hidden state of the action selection network 112 at a time step may be referred to in this specification as a "key-value tuple". As illustrated by 124, key-value tuples stored in the memory 122 at different time steps can be represented in a tabular format, where each row of the table corresponds to a respective key-value tuple. The memory 122 (which is sometimes called an "external memory") may be implemented as a physical data storage device, a logical data storage area, or in any other appropriate way.

In some cases, the memory interface system 118 may store a respective key-value tuple in the memory 122 for each time step. Alternatively, the memory interface system 118 may be configured to store a key-value tuple for a current time step in the memory 122 only if a particular criterion is satisfied. For example, the memory interface system 118 may store the key-value tuple for a current time step in the memory only if the task to be accomplished by the agent 104 at the next time step is different than the current task being accomplished by the agent at the current time step. In this example, the memory interface system 118 can store the most up-to-date information that the system 100 has learned about the current task being accomplished at the current time step before the agent transitions to accomplishing a different task at the next time step. The memory interface system 118 may determine that the task to be accomplished by the agent starting at the next time step is different than the task currently being accomplished by the agent at the current time step in any appropriate manner. For example, the memory interface system 118 may determine that the next task is different than the current task if a similarity measure between the respective key embeddings of the context data at the current time step and the next time step is below a predetermined threshold. The similarity measure may be, for example, a cosine similarity measure or a similarity measure based on a norm (e.g., an $L_1$, $L_2$, norm) of a difference between the respective key embeddings of the context data at the current time step and the next time step.

At each time step, the system 100 determines the action 102 to be performed by the agent 104 at the time step based on both: (i) the observation characterizing the current state of the environment at the time step, and (ii) a "remembered" value of the hidden state 126 of the action selection network 112. As described earlier, the remembered value of the hidden state 126 of the action selection network 112 represents information previously learned by the agent about the current task. The memory interface system 118 determines the remembered value of the hidden state 126 using the key embedding of the current context data 116 and the key-value tuples stored in the memory 122. For example, to determine the remembered value of the hidden state 126, the memory interface system 118 may identify a predetermined number of key embeddings stored in the memory that are most similar to the key embedding of the current context data. Thereafter, the memory interface system 118 may determine the remembered value of the hidden state 126 to be a combination (e.g., a weighted sum) of the previous values of the hidden states of the action selection network 112 that correspond to the set of identified key embeddings. An example process for determining a remembered value of the hidden state of the action selection network 112 is described in more detail with reference to FIG. 5.

The manner in which the action selection network 112 processes the observation 108 and the remembered value of the hidden state 126 to generate the action selection output 114 depends on the architecture of the action selection network 112. For example, the hidden state of the action selection network 112 may refer to the LSTM "cell" state, and the system 100 may directly combine the remembered value of the cell state with the current value of the cell state using a gating mechanism. An example LSTM architecture of the action selection network 112 that combines the remembered value of the cell state with the current value of the cell state using a gating mechanism is described in more detail with reference to FIG. 3. As another example, the remembered value of the hidden state may be combined (e.g., concatenated) with the observation before being processed by the action selection network 112.

The memory interface system 118 can store key-value tuples and determine remembered hidden states 126 from the memory 122 both during and after the training of the agent 104. That is, the memory interface system 118 can be used in the described manner at a time step independently of whether the system 100 adjusts the current parameter values of the action selection network 112 at the time step using a reinforcement learning technique.

Figure 2:
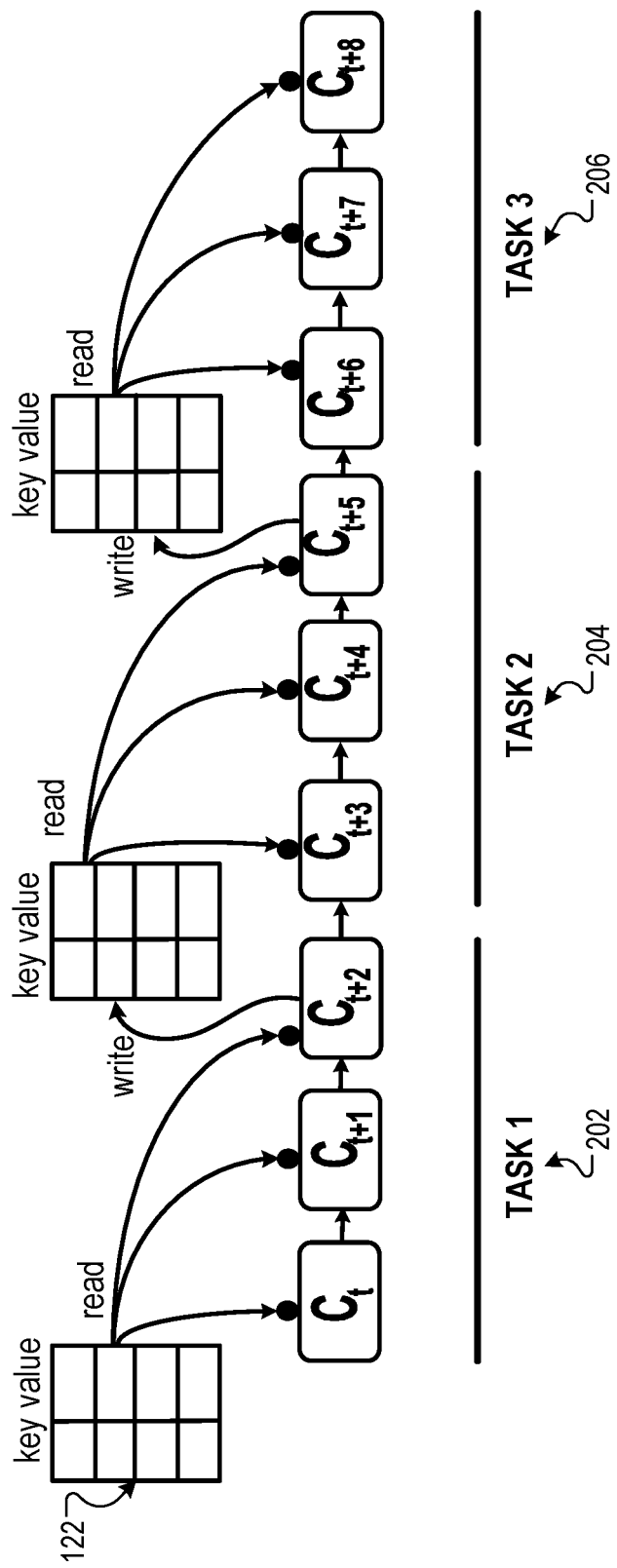
FIG. 2 is an illustration of how a reinforcement learning system can read and write data to and from a memory over the course of a sequence of time steps during which the agent performs actions to accomplish multiple different tasks.

FIG. 2 is an illustration of how the reinforcement learning system can read and write data to and from a memory 122 over the course of a sequence of time steps during which the agent performs actions to accomplish three different tasks. The agent performs actions to accomplish task 1 (202) over time steps t, t+1, and t+2. The value of the hidden state of the action selection network at time steps t, t+1, and t+2 respectively are $C_t$, $C_{t+1}$, and $C_{t+2}$. At time steps t, t+1, and t+2, the reinforcement learning system reads data from the memory 122 to determine remembered values of the hidden state of the action selection network. At each time step, the reinforcement learning system can use the remembered value of the hidden state to adjust the current value of the hidden state, as will be described in more detail with reference to FIG. 3. The reinforcement learning system stores a key-value tuple representing the key embedding of the current context data and the current value of the hidden state of the action selection network in the memory at time step t+2, before starting to perform actions to accomplish task 2 (204). The current value of the hidden state of the action selection network at time step t+2 implicitly represents information that the agent has learned about task 1 as of time step t+2. After performing actions to accomplish task 1, the reinforcement learning system proceeds similarly to select actions to be performed to accomplish task 2 (204) and task 3 (206).

Figure 3:
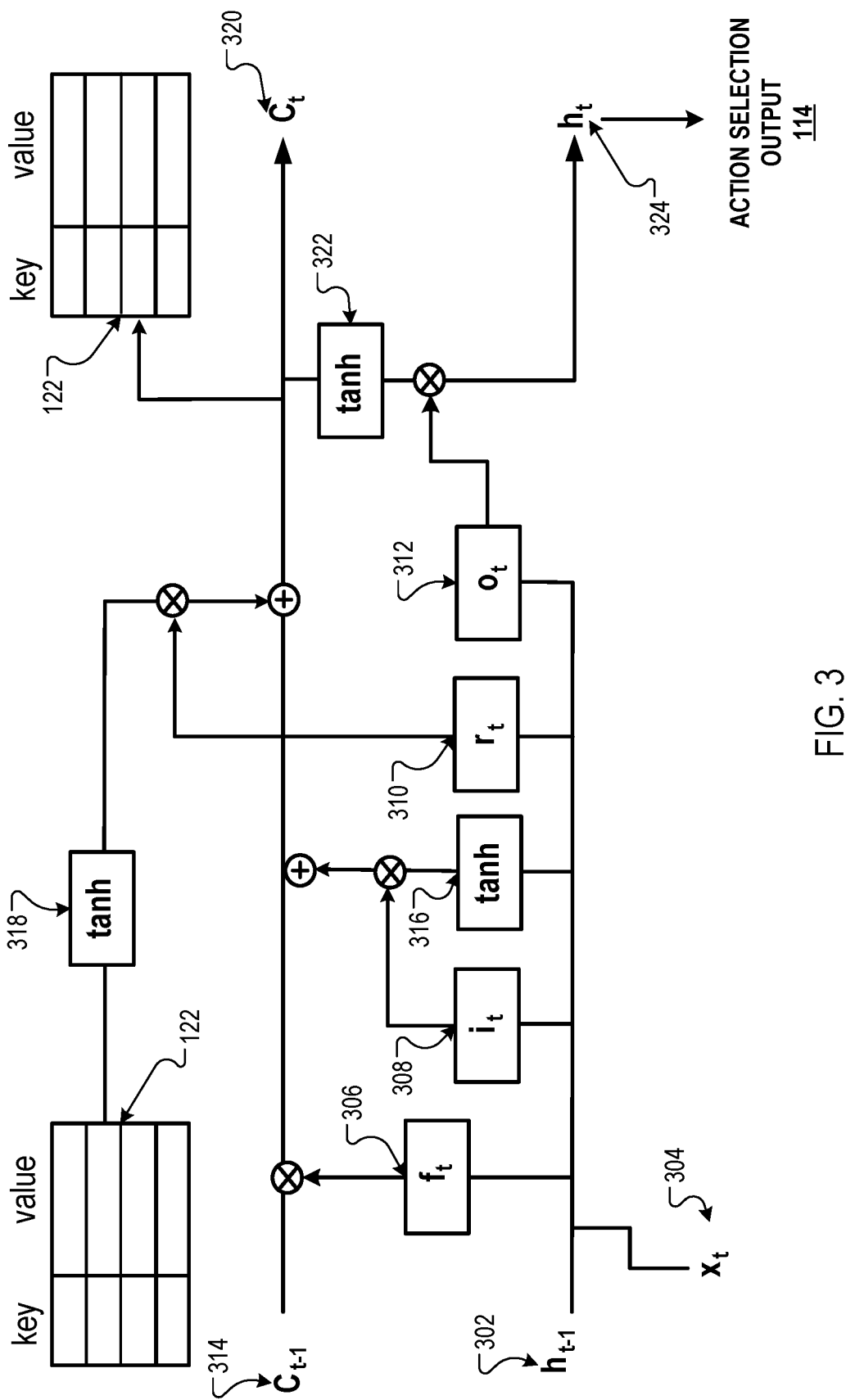
FIG. 3 is an illustration of an example architecture of a long short-term memory (LSTM) action selection network.

FIG. 3 is an illustration of an example architecture of an LSTM action selection network. In particular, FIG. 3 illustrates the operation of the action selection network at a particular time step t. The action selection network processes an intermediate output $h_{t-1}$ 302 generated by the action selection network at the previous time step and the current observation $x_t$ 304 to generate a forget gate $f_t$ 306, an input gate $i_t$ 308, a reinstatement gate $r_t$ 310, and an output gate $o_f$ 312. Each of the "gates" represent the activations of respective sets of neurons in response to processing $h_{t-1}$ 302 and $x_t$ 304 using respective sets of one or more neural network layers. The action selection network may generate the values of the gates in accordance with the following equations:

$$i_t = \sigma(W_{xi}x_t + W_{hi}h_{t-1} + b_i) \quad (1)$$

$$f_t = \sigma(W_{xf}x_t + W_{hf}h_{t-1} + b_f) \quad (2)$$

$$r_t = \sigma(W_{xr}x_t + W_{hr}h_{t-1} + b_r) \quad (3)$$

where $X_{xi}$, $X_{hi}$, $b_i$, $W_{xf}$, $W_{hf}$, $b_f$, $W_{xr}$, $W_{hr}$, $b_r$ are trainable layer weight parameters of the action selection network and $\sigma(\bullet)$ represents a sigmoid activation function that causes the value of each component of the gates to be between 0 and 1.

The action selection network uses the forget gate $f_t$ 306, the input gate $i_t$ 308, and the reinstatement gate $r_t$ 310 to update the value of the cell state. In particular, the action selection network uses the forget gate $f_t$ 306 to regulate how information should be removed from the cell state by pointwise multiplying the forget gate $f_t$ 306 and the value of the cell state $C_{t-1}$ 314 from the previous time step. The action selection network uses the input gate to regulate how information derived from $h_{t-1}$ 302 and $x_t$ 304 should be added to the cell state. In particular, the action selection network generates "candidate" data to be added to the cell state by processing $h_{t-1}$ and $x_t$ using a tanh activation function 316, pointwise multiplies the input gate $i_t$ 308 with the candidate data, and adds the result of the pointwise multiplication to the current value of the cell state. The action selection network uses the reinstatement gate to regulate how information from the remembered value of the cell state of the action selection network that is obtained from the memory 122 (as described with reference to FIG. 1) should be added to the cell state. In particular, the action selection network processes the remembered value of the cell state using a tanh activation function 318, pointwise multiplies the output of the tanh activation function 318 with the reinstatement gate $r_t$ 310, and adds the result to the current value of the cell state to generate the new cell state value $C_t$ 320. In this example, the reinstatement gate $r_t$ 310 has the same dimensionality as the cell state of the action selection network. For example, the action selection network may generate the new cell state value $C_t$ 320 in accordance with the following equation:

$$C_t = i_t \odot c_{in} + f_t \odot C_{t-1} + r_t \odot c_{ep} \quad (4)$$

where $\odot$ represents pointwise vector multiplication, $c_{in}$ represents the candidate data to be added to the cell state, $c_{ep}$ represents the result of processing the remembered value of the cell state using a tanh activation function, and the other variables are defined as previously.

Optionally, the reinforcement learning system may write the current key-value tuple corresponding to the key embedding of the current context data and the new cell state value $C_t$ to the memory 122. For example, the reinforcement learning system may write the current key-value tuple to the memory 122 if, at the next time step, the agent performs actions to accomplish a different task from the current task.

The action selection network generates the action selection output 114 by processing the new cell state value $C_t$ 320 using the tanh activation function 322 and pointwise multiplying the result by the output gate $o_t$ 312 to generate the intermediate output $h_t$ 324. The action selection network processes the intermediate output $h_t$ using one or more additional neural network layers (e.g., fully connected or recurrent neural network layers) to generate the action selection output 114.

Figure 4:
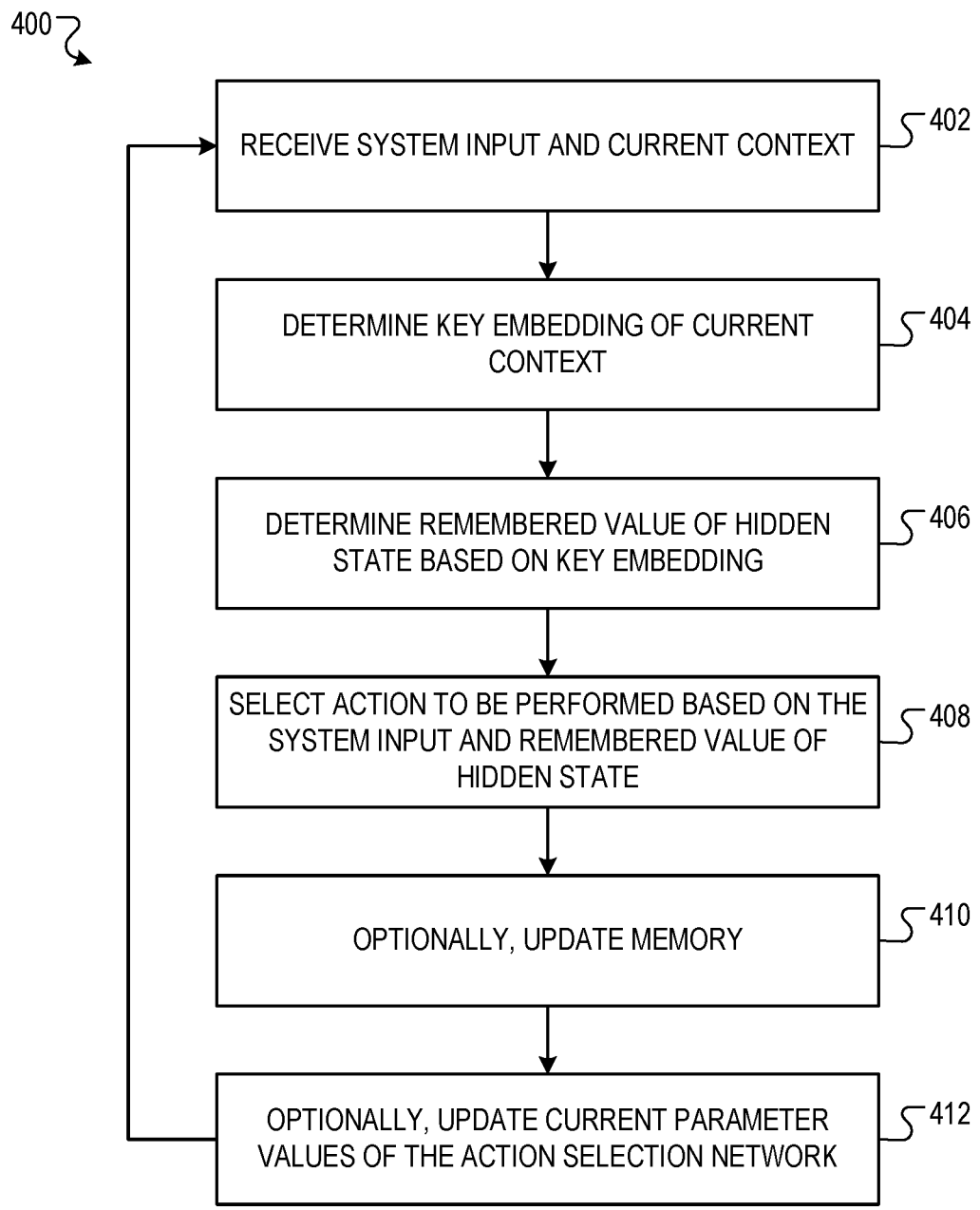
FIG. 4 is a flow diagram of an example process for selecting actions to be performed by an agent to accomplish tasks using remembered values of a hidden state of an action selection network.

FIG. 4 is a flow diagram of an example process 400 for selecting actions to be performed by an agent to accomplish tasks using remembered values of hidden states of an action selection network. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400. The system can perform steps 402-412 of the process 400 at each time step in a sequence steps to select an action to be performed by the agent at the time step.

The system receives a current observation (sometimes referred to as a "system input") that characterizes the current state of the environment and current context data that characterizes a "context" of the current observation (402). More specifically, the current context data characterizes the current task the agent is required to accomplish. As described earlier, the system can obtain the current observation and the current context data from any appropriate sources. For example, the system can obtain the current observation from one or more sensors of the agent. As another example, the system can obtain the current context data from a user of the agent or from the current observation. In a particular example, the system may obtain the current context data by processing an observation that includes an image of the environment to identify and parse a barcode label visible in the image that defines a component assembly task to be accomplished by the agent.

The system determines a key embedding from the current context data (404). The key embedding is a representation of the current context data as an ordered collection of numerical values, for example, a vector or matrix of numerical values. The system can generate the key embedding in any appropriate manner. For example, the system may process the current context data using an embedding neural network to generate the key embedding. In a particular example, the current context data may be represented as an image, and the system may generate the key embedding by processing the image using an embedding neural network that includes one or more convolutional layers followed by a fully connected layer. As another example, the system may determine the key embedding by a predetermined mapping to the current context data. In a particular example, the current context data may be represented as sequence of alpha-numeric characters, and the system may generate the key embedding by mapping each character to a corresponding one-hot vector that represents the character.

The system determines a remembered value of the hidden state of the action selection network based on the key embedding for the current context data (406). The system may determine the remembered value of the hidden state by combining one or more previous values of the hidden state of the action selection network that are stored in a memory. As described earlier, the memory stores key-value tuples (sometimes called "context experience tuples") which each include: (i) a key embedding of the context data received at a previous time step, and (ii) the value of the hidden state of the action selection network at the previous time step. An example process for determining a remembered value of the hidden state of the action selection network is described with reference to FIG. 3.

The system selects the action to be performed by the agent at the current time step by processing an input including the current observation and the remembered value of the hidden state of the action selection network using the action selection network (408). The action selection network is configured to process the input to generate an action selection output (sometimes referred to as a "system output"), and the system selects the action to be performed by the agent at the current time step based on the action selection output. For example, as described earlier, the action selection output may define a probability distribution over a set of possible actions, and the system may select the action to be performed by the agent at the current time step by sampling an action in accordance with the probability distribution. Optionally, the system may use an exploration policy in selecting the action to be performed by the agent.

The action selection network is a recurrent neural network that can be implemented using any appropriate architecture. For example, the action selection network may be an LSTM network, and the "hidden state" may refer to the cell state of the LSTM network. As described with reference to FIG. 3, the action selection LSTM network can combined the remembered value of the cell state (i.e., as determined in 406) with the current value of the cell state using a gating mechanism.

Optionally, the system updates the memory by storing the key-value tuple for the current time step (i.e., the embedding of the current context data and the current value of the hidden state of the action selection network) in the memory (410). In some implementations, the system updates the memory at every time step. In some other implementations, the system updates the memory at a time step only if a particular criterion is satisfied. For example, as described earlier, the system may store the key-value tuple for the current time step in the memory only if the task to be accomplished by the agent at the next time step is different than the current task being accomplished by the agent at the current time step.

To update the memory, the system can determine whether the current key embedding matches any of the key embeddings currently stored in the memory. The system may determine that the current key embedding matches a particular key embedding stored in the memory if a measure of similarity between them (e.g., a cosine measure of similarity) exceeds a predetermined threshold. In response to determining that the current key embedding matches a particular key embedding included in a particular key-value tuple currently stored in the memory, the system can update the particular key-value tuple using the current hidden state of the action selection network. In particular, the system can set the value of the hidden state included in the particular key-value tuple to be the current value of the hidden state of the action selection network. In response to determining that the current key embedding does not match any key embeddings currently stored in the memory, the system can store the current key-value tuple in the memory (i.e., and thereby add a new key-value tuple to the memory).

Optionally, the system can update the current values of the action selection network parameters using a reinforcement learning technique (412). As described earlier, the system can use any appropriate reinforcement learning technique, for example, a Q-learning or actor-critic reinforcement learning technique. In particular, the system can update the current values of the action selection network by determining a gradient of a reinforcement learning loss function (e.g., by backpropagation) and using the gradient to adjust the current values of the action selection network parameters a gradient descent update rule. In addition to updating the current values of the action selection network parameters, the system can jointly update the current values of the embedding neural network used to generate the key embeddings of the context data.

If current time step is not a final time step, the system can return to 402 and repeat the steps of the process 400 to select the action to be performed by the agent at the next time step. Otherwise, the system can output the trained values of the action selection network parameters.

Figure 5:
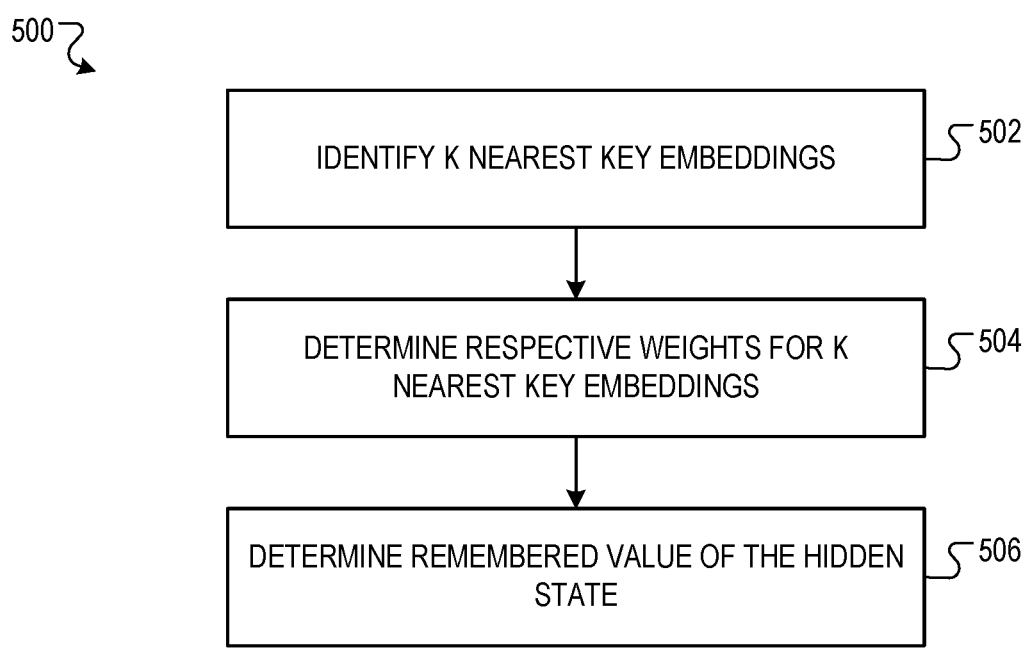
FIG. 5 is a flow diagram of an example process for determining a remembered value of a hidden state of an action selection network.

FIG. 5 is a flow diagram of an example process 500 for determining a remembered value of a hidden state of an action selection network. For convenience, the process 500 will be described as being performed by a system of one or more computers located in one or more locations. For example, a reinforcement learning system, e.g., the reinforcement learning system 100 of FIG. 1, appropriately programmed in accordance with this specification, can perform the process 500.

The system identifies a predetermined number (i.e., "k") of key embeddings included in key-value tuples in the memory that are "nearest" to the key embedding of the current context data (502). For example, the system may determine a respective distance between the key embedding of the current context data and each of the key embeddings stored in the memory. The system can determine the distance between two key embeddings in any appropriate manner, for example, using a cosine distance or a norm (e.g., an $L_1$, $L_2$, $L_\infty$) of a difference between the two key embeddings. After determining the respective distances, the system can identify the k nearest key embeddings stored in the memory which are separated from the key embedding of the current context data by the shortest distance.

The system determines a respective weight (i.e., numerical weighting value) for each of the k nearest key embeddings based on the respective distances between each of the k nearest key embeddings and the key embedding of the current context data (504). For example, the system may determine a higher weight for key embeddings that are separated from the key embedding of the current context data by a shorter distance. In a particular example, the system may determine the weight $w_i$ for a key embedding $h_i$ from the set of k nearest key embeddings as:

$$w_i = \frac{c_s(h, h_i)}{\sum_{j=1}^{k} c_s(h, h_j)} \quad (5)$$

where h represents the key embedding of the current context data, $c_s(\cdot,\cdot)$ represents the cosine similarity measure (i.e., that is given by $1-c_d(\cdot,\cdot)$, where $c_d(\cdot,\cdot)$ represents the cosine distance measure), and $\{h_j\}_{j=1}^{k}$ represent the k nearest key embeddings.

The system determines the remembered value of the hidden state by combining the values of the hidden states stored in the memory that correspond to the k nearest key embeddings based on the weights (506). For example, the system may determine the remembered value of the hidden state o as:

$$o = \sum_{i=1}^{k} w_i \cdot v_i \quad (6)$$

where the sum is over the k nearest key embeddings, $w_i$ represents the weight determined for the nearest key embedding corresponding to index i, and $h_i$ represents the previous value of the hidden state of the action selection network corresponding to the nearest key embedding corresponding to index i.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that when executed by the one or more computers cause the one or more computers to implement:
    an external memory, wherein the external memory maintains a plurality of context experience tuples, each context experience tuple comprising: (i) a key embedding of context data that characterizes a context of a system input at a respective previous time step, and (ii) a value of a hidden state of a neural network at the respective previous time step; and
    the neural network, wherein the neural network is configured to, at each of a plurality of time steps:
        receive a system input and a remembered value of the hidden state of the neural network, and
        process the system input and the remembered value of the hidden state in accordance with current parameter values of the neural network to generate a system output; and
    a memory interface subsystem that is configured to, at each of a plurality of time steps:
        receive current context data that characterizes a current context of a system input;
        determine a key embedding for the current context data;
        determine a remembered value of the hidden state of the neural network based on the key embedding for the current context data, comprising combining one or more previous values of the hidden state of the neural network included in context experience tuples in the external memory; and provide the remembered value of the hidden state as an input to the neural network.

2. The system of claim 1, wherein the neural network is an action selection neural network that is used to select actions to be performed by an agent interacting with an environment, the system input comprises an observation characterizing a current state of the environment, and the system output comprises an action selection output.

3. The system of claim 1, wherein the neural network is a long short-term memory network and the hidden state of the neural network is a cell state.

4. The system of claim 1, wherein generating the system output comprises:

determining a gating vector with a same dimensionality as the hidden state of the neural network, comprising processing the system input in accordance with current parameter values of the neural network; and generating the system output based at least on a pointwise product of the gating vector and the remembered value of the hidden state of the neural network.

5. The system of claim 4, wherein each entry of the gating vector is between 0 and 1.

6. The system of claim 1, wherein determining the remembered value of the hidden state of the neural network comprises:

determining a respective weight for each of k nearest key embeddings included in context experience tuples in the external memory from distances between the k nearest key embeddings and the current key embedding according to a distance measure;

for each of the k nearest key embeddings in the external memory, weighting the value of the hidden state corresponding to the key embedding by the weight for the key embedding; and determining the remembered value of the hidden state by combining the values of the hidden states corresponding to the k nearest key embeddings based on the weights.

7. The system of claim 1, wherein the memory interface subsystem is further configured to, at each of a plurality of time steps:

determine whether the current key embedding matches any of the key embeddings included in context experience tuples currently in the external memory; and when the current key embedding does not match any of the key embeddings included in context experience tuples currently in the external memory:

adding a new context experience tuple to the external memory, the new context experience tuple comprising: (i) the current key embedding, and (ii) the current value of the hidden state of the neural network.

8. The system of claim 7, further comprising:

when the current key embedding matches a key embedding included in a context experience tuple currently in the external memory:

updating the context experience tuple currently in the external memory by setting the value of the hidden state included in the experience tuple to be the current value of the hidden state of the action selection neural network.

9. The system of claim 2, wherein the action selection neural network is trained using reinforcement learning training techniques.

10. The system of claim 2, wherein the action selection output is a probability distribution over a set of actions that can be performed by the agent.

11. The system of claim 2, wherein the action selection output indicates a single action to be performed by the agent.

12. The system of claim 2, wherein the action to be performed by the agent is selected based on the action selection output with probability $1-\epsilon$, and is selected randomly from a set of actions that can be performed by the agent with probability $\epsilon$, where $\epsilon \in (0,1)$.

13. The system of claim 1, wherein determining a key embedding for the current context data comprises processing the current context data by an embedding neural network.

14. The system of claim 13, wherein the embedding network is a convolutional neural network.

15. The system of claim 1, wherein the context data comprises an image.

16. The system of claim 1, wherein the context data comprises a sequence of alpha-numeric characters.

17. One or more non-transitory computer storage media storing instructions that when executed by one or more computers cause the one or more computers to perform operations comprising:

receiving: (i) a current system input and (ii) current context data that characterizes a context of the current system input;

determining a key embedding for the current context data;

determining a remembered value of a hidden state of a neural network based on the key embedding for the current context data, comprising combining one or more previous values of the hidden state of the neural network included in context experience tuples stored in an external memory, wherein:

the external memory maintains a plurality of context experience tuples, and each context experience tuple comprises: (i) a key embedding of context data that characterizes the context of a previous system input at a respective previous time step, and (ii) a previous value of the hidden state of the neural network at the respective previous time step; and processing the system input and the remembered value of the hidden state of the neural network using the neural network, in accordance with current parameter values of the neural network, to generate a system output.

18. The non-transitory computer storage media of claim 17, wherein the neural network is an action selection neural network that is used to select actions to be performed by an agent interacting with an environment, the system input comprises an observation characterizing a current state of the environment, and the system output comprises an action selection output.

19. A method performed by one or more data processing apparatus, the method comprising:

receiving: (i) a current system input and (ii) current context data that characterizes a context of the current system input;

determining a key embedding for the current context data;

determining a remembered value of a hidden state of a neural network based on the key embedding for the current context data, comprising combining one or more previous values of the hidden state of the neural network included in context experience tuples stored in an external memory, wherein:

the external memory maintains a plurality of context experience tuples, and each context experience tuple comprises: (i) a key embedding of context data that characterizes the context of a previous system input at a respective previous time step, and (ii) a previous value of the hidden state of the neural network at the respective previous time step; and processing the system input and the remembered value of the hidden state of the neural network using the neural network, in accordance with current parameter values of the neural network, to generate a system output.

20. The method of claim 19, wherein the neural network is an action selection neural network that is used to select actions to be performed by an agent interacting with an environment, the system input comprises an observation characterizing a current state of the environment, and the system output comprises an action selection output.

* * * * *